(12) United States Patent
Braganca et al.

(10) Patent No.: US 9,218,831 B1
(45) Date of Patent: Dec. 22, 2015

(54) SIDE-BY-SIDE MAGNETIC MULTI-INPUT MULTI-OUTPUT (MIMO) READ HEAD

(71) Applicant: HGST Netherlands B.V., Amsterdam (NL)

(72) Inventors: Patrick Mesquita Braganca, San Jose, CA (US); Jordan Asher Katine, Mountain View, CA (US); Hsin-wei Tseng, Cupertino, CA (US); Howard Gordon Zolla, Los Gatos, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/489,299

(22) Filed: Sep. 17, 2014

(51) Int. Cl.
*G11B 5/39* (2006.01)

(52) U.S. Cl.
CPC ............ *G11B 5/3958* (2013.01); *G11B 5/3945* (2013.01)

(58) Field of Classification Search
CPC .. G11B 5/3945; G11B 5/3948; G11B 5/3951; G11B 5/3954; G11B 5/3958; G11B 5/3961; G11B 5/3964
USPC .................................. 360/314–316
See application file for complete search history.

(56) References Cited

U.S. PATENT DOCUMENTS

| 5,079,831 | A | | 1/1992 | Reid | |
|---|---|---|---|---|---|
| 5,309,304 | A | * | 5/1994 | Naberhuis et al. | 360/322 |
| 5,696,654 | A | | 12/1997 | Gill et al. | |
| 5,734,532 | A | * | 3/1998 | Kobayashi et al. | 360/316 |
| 5,783,460 | A | | 7/1998 | Han et al. | |
| 5,784,772 | A | * | 7/1998 | Ewasko et al. | 29/603.15 |
| 6,002,554 | A | * | 12/1999 | Schmalhorst et al. | 360/316 |
| 6,204,071 | B1 | | 3/2001 | Ju et al. | |
| 6,271,998 | B1 | * | 8/2001 | Coehoorn et al. | 360/324.2 |
| 6,344,951 | B1 | * | 2/2002 | Sato et al. | 360/316 |
| 6,449,131 | B2 | | 9/2002 | Guo et al. | |
| 7,343,667 | B2 | | 3/2008 | Lille | |
| 7,751,148 | B1 | * | 7/2010 | Alstrin et al. | 360/241.1 |
| 8,786,987 | B2 | * | 7/2014 | Edelman et al. | 360/324.12 |
| 8,824,106 | B1 | * | 9/2014 | Garfunkel et al. | 360/316 |
| 8,953,284 | B1 | * | 2/2015 | Mashima et al. | 360/316 |
| 2002/0149887 | A1 | * | 10/2002 | Sato | 360/319 |
| 2004/0100737 | A1 | * | 5/2004 | Nakamoto et al. | 360/319 |
| 2011/0069413 | A1 | * | 3/2011 | Maat et al. | 360/234.3 |
| 2014/0063644 | A1 | * | 3/2014 | Lou et al. | 360/75 |
| 2014/0177102 | A1 | * | 6/2014 | Kief et al. | 360/128 |
| 2015/0062735 | A1 | * | 3/2015 | Sapozhnikov et al. | 360/46 |

FOREIGN PATENT DOCUMENTS

| EP | 694911 | A2 | * | 1/1996 |
|---|---|---|---|---|
| EP | 789350 | A2 | * | 8/1997 |
| EP | 2704144 | A2 | * | 3/2014 |
| JP | 58179922 | A | * | 10/1983 |

* cited by examiner

*Primary Examiner* — Will J Klimowicz
(74) *Attorney, Agent, or Firm* — Alleman Hall McCoy Russell & Tuttle LLP

(57) ABSTRACT

A side-by-side magnetic multi-input multi-output (MIMO) read head is provided. The read head may include a pair of side-by-side MIMO read sensors disposed between a bottom shield, a top shield and between a pair of side shields. The read head may also include a pair of electrical leads, each of which is coupled with one of the MIMO read sensors. The electrical leads extend away from an air bearing surface.

8 Claims, 14 Drawing Sheets

SIDE-BY-SIDE MAGNETIC MULTI-INPUT MULTI-OUTPUT (MIMO) READ HEAD

BACKGROUND

In recent years, read heads of magnetic hard disk drives have become progressively smaller, data tracks on the magnetic disks of hard disk drives have become progressively narrower, and as a result, the areal density of stored data has increased. An emerging technology referred to as multiple-input, multiple-output (MIMO) recording uses closely spaced, symmetric side-by-side read sensors to further improve areal density. As the side-by-side read sensors are miniaturized, the gap between the read sensors narrows. As this gap narrows, the read head becomes more challenging to fabricate. One difficulty encountered is that, as the gap between lead structures narrows, it becomes more difficult to place the lead structures close together without creating a short circuit. It is also difficult to economically connect the lead structures to the rest of the read head, while keeping the overall resistance at acceptably low levels.

SUMMARY

A side-by-side magnetic multi-input multi-output (MIMO) read head is provided. The read head may include a pair of side-by-side MIMO read sensors disposed between a bottom shield, a top shield and between a pair of side shields. The read head may also include a pair of electrical leads, each of which is coupled with one of the MIMO read sensors. The electrical leads extend away from an air bearing surface.

According to another aspect, a method of making a side-by-side magnetic multi-input multi-output (MIMO) read head is disclosed. The method may include forming a pair of side-by-side MIMO read sensors disposed between a bottom shield and a top shield and a pair of side shields. The method may further include forming a pair of electrical leads, each of which is coupled with one of the MIMO read sensors, wherein the electrical leads are formed so as to extend away from an air bearing surface.

According to another aspect, a method of making a side-by-side multi-input multi-output (MIMO) read head is disclosed, which may include forming a substrate by depositing a sensor layer over a bottom shield layer on a wafer, and depositing a capping layer (CL) over the sensor layer. The method may further include depositing a layer of electrical lead over the capping layer (CL), depositing a first hard mask layer, which may consist of diamond like carbon (DLC) or other suitable material, over the layer of electrical lead, and performing sidewall spacer line doubling to leave stripes of a second hard mask layer on the first hard mask layer to be used as an etch mask for patterning the first hard mask layer. These stripes may extend away from an air bearing surface, and may be configured with flared portions having a lateral separation that increases with an increasing distance from an air bearing surface that is formed transversely to the length of the leads. The method may further include etching away the sensor material surrounding the stripes of first and second hard mask layers and depositing thin insulator, magnetic side shield, and a third hard mask layer, and then removing all layers above the layer of electrical lead (including the first, second, and third hard mask layers, thin insulator, and magnetic side shield), leaving stripes of sensor layer, coupled with electrical leads that are configured with the flared portion having a lateral separation that increases with an increasing distance from an air bearing surface that is formed transversely to the length of the leads.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
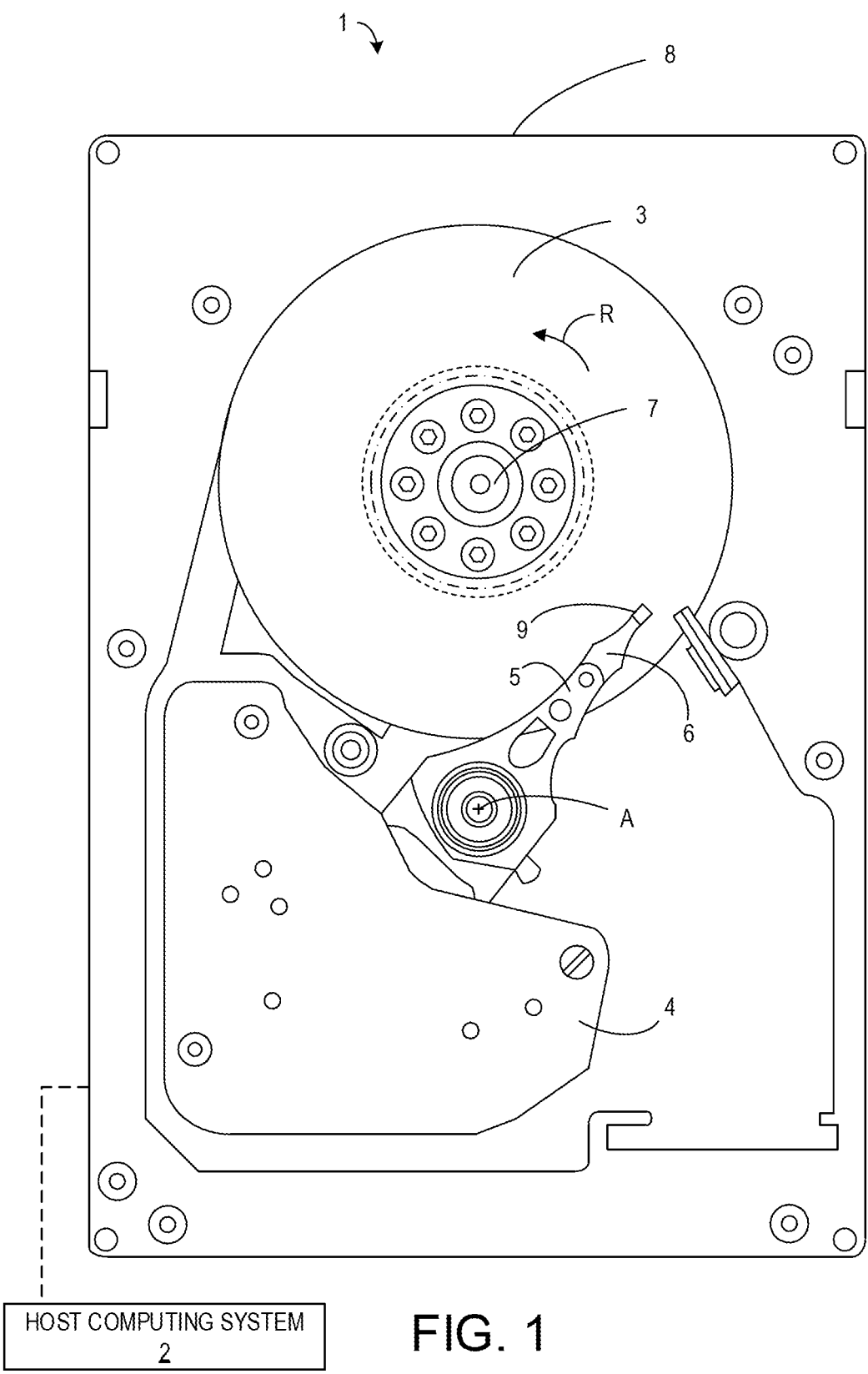
FIG. 1 illustrates an exemplary magnetic disk drive, according to one disclosed embodiment.
Figure 2:
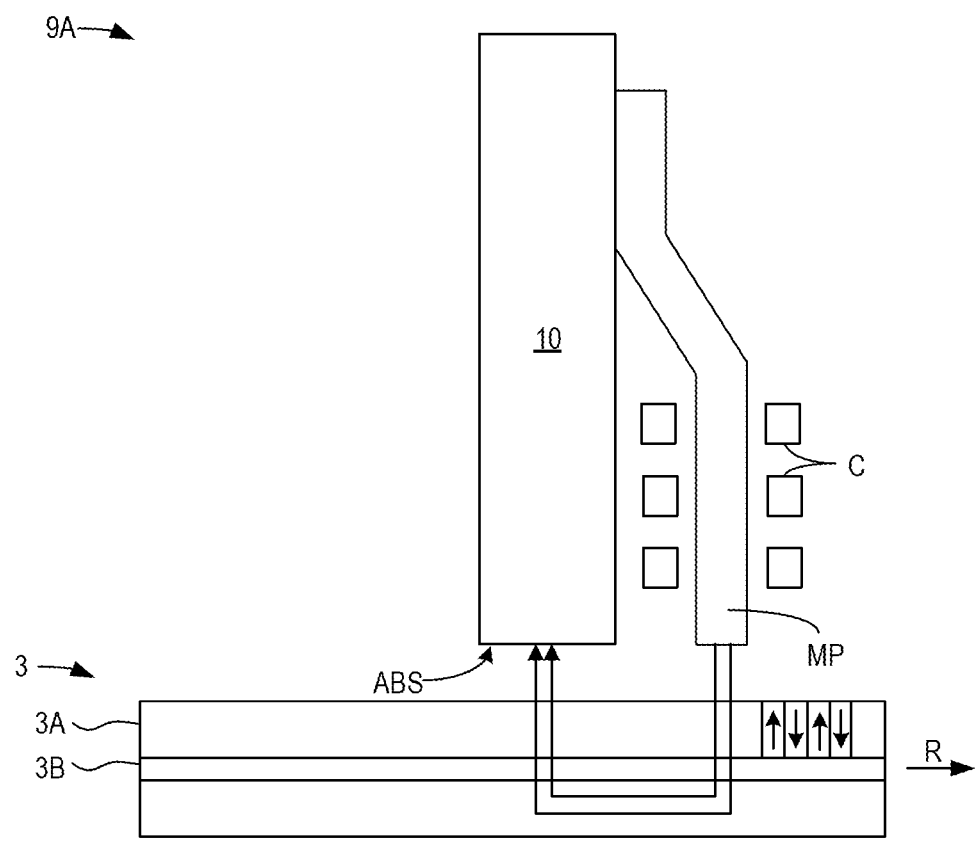
FIG. 2 is a schematic partial cross-sectional side view through a middle section of a read/write head of the magnetic disk drive of FIG. 1.

In view of the above, the present disclosure is directed to a read head, an embodiment of which is shown in FIG. 2, for a magnetic recording system such as disk drive as shown in FIG. 1. The read head includes flared portions extending away from the narrowly spaced leads, which enables lead stitches to be more easily formed. The disk drive environment, the read head structure, and a method for manufacturing the read head are described in turn below.

Turning initially to FIG. 1, this Figure illustrates a top view of an exemplary hard disk drive (HDD) 1, according to an embodiment of the disclosure. Hard disk drive (HDD) 1 is coupled to an associated host computing system 2, and is used to store information used by the computing system during processing. As illustrated, HDD 1 may include one or more magnetic disks 3, actuators 4, actuator arms 5, and suspension arms 6 associated with each of the magnetic disks 3, and a spindle motor 7 affixed in a chassis 8. The magnetic disks 3 may be arranged in a vertical stack, if more than one is provided. Moreover, the one or more magnetic disks 3 may be coupled with the spindle motor 7 for rotation in a rotation direction R.

Magnetic disks 3 may include tracks of data on both the top and bottom surfaces of the disk. A magnetic head mounted in a slider 9 may be positioned on a track. As each disk spins, data may be written on and/or read from the data track via a corresponding read head and write head of the recording head. The slider 9 and magnetic head contained therein may be coupled to an actuator arm 5 via a suspension arm 6. Actuator arm 5 may be configured to rotate about actuator axis A to place the magnetic head within slider 9 on a particular data track. It is to be understood that the actuator arm 5 alternatively may be configured to move in a manner other than swiveling around actuator axis A.

The suspension arm 6 biases the slider so that the slider bends towards the surface of the magnetic disk 3 when the disk 3 is not rotating. When the magnetic disk 3 rotates, air is swirled by the rotating disk 3 adjacent to a media facing surface (MFS) of the slider 9 causing the slider 9 to ride on an air bearing a slight distance from the surface of the rotating disk 3. For this reason, the MFS is also referred to as an air bearing surface (ABS). When the slider rides on the air bearing, the read and write heads are employed for reading and writing magnetic transitions corresponding to host data of the host computing system 2. The read and write heads are connected to signal processing circuitry that operates according to a computer program implemented in a processor or other logic circuitry integrated within or coupled to the HDD 1 to thereby implement the writing and reading functions.

FIG. 2 is a schematic partial cross-sectional view through the middle section of a read/write head 9A of the magnetic head within the slider 9 of FIG. 1, facing magnetic disk 3. It will be appreciated that the magnetic disk 3 may be a multi-layer medium that includes a perpendicular magnetic data recording layer (RL) 3A on a "soft" or relatively low-coercivity magnetically permeable underlayer (PL) 3B.

The read/write head 9A includes an ABS, a magnetic write head and a magnetic read head, and is mounted such that the ABS is facing the magnetic disk 3. In FIG. 2, the disk 3 moves past the read/write head 9A in the direction indicated by the arrow R. The RL 3A is illustrated with perpendicularly recorded or magnetized regions, with adjacent regions having magnetization directions, as represented by the arrows located in the RL 3A. The magnetic fields of the adjacent magnetized regions are detectable by a read head 10 as the recorded bits. The write head includes a magnetic circuit made up of a main pole MP and a thin film coil C shown in the section embedded in nonmagnetic material. It is to be understood that while the description has been made with reference to perpendicularly recorded regions, the embodiments disclosed herein are not limited to perpendicular magnetic recording. The embodiments disclosed herein are equally applicable to other magnetic recording possibilities as well.

As discussed herein, the read head includes a read sensor. In the embodiments herein, the read sensor comprises multiple sensors. These multiple sensors may be arranged in a side-by-side head structure in which the two sensors sit side-by-side in a single read gap. Additionally, the multiple sensors may be used in a read head structure whereby the side-by-side sensors have additional sensors positioned over or under the two side-by-side sensors.

Figure 3:
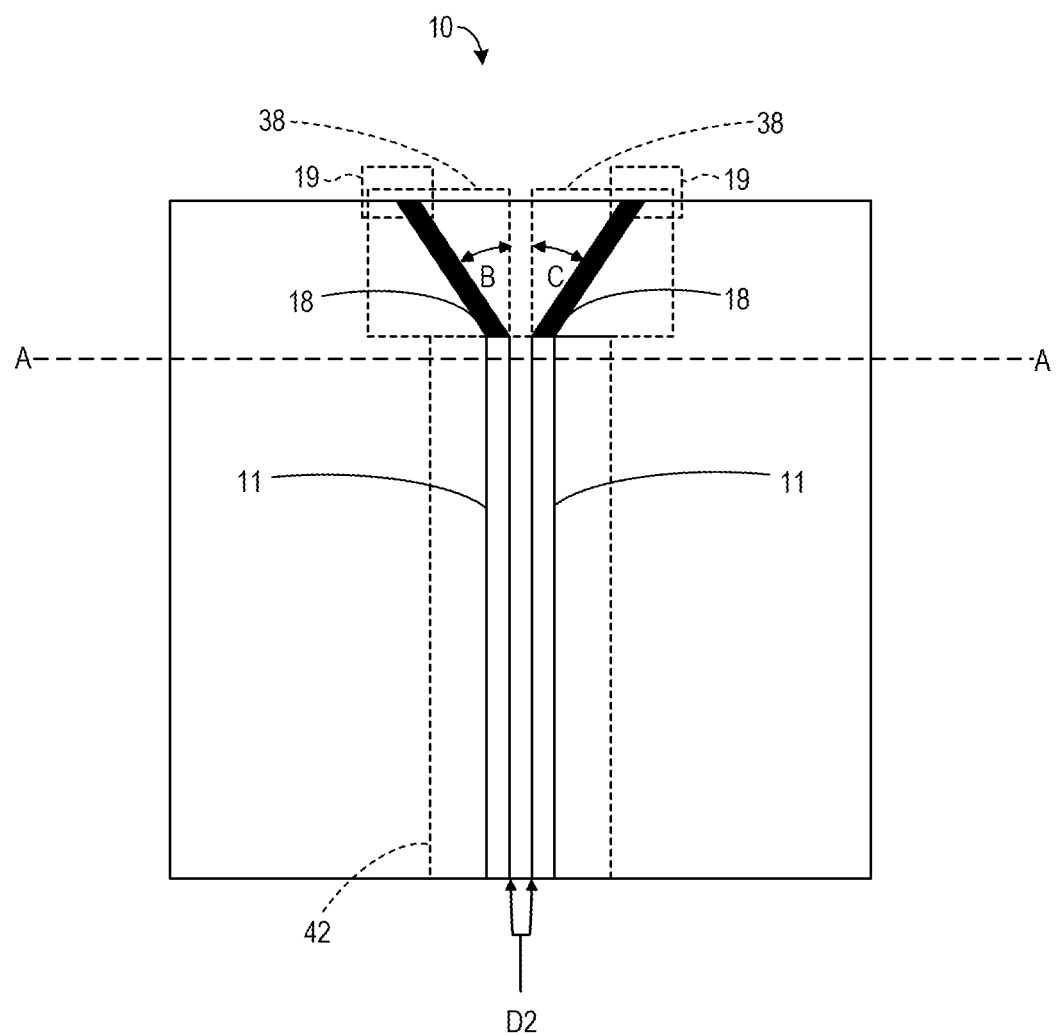
FIG. 3 is a schematic illustration of the read head showing the flared portions, the parallel portion, and the air bearing surface.

Turning now to FIG. 3, a side-by-side magnetic multi-input multi-output (MIMO) read head 10 according to one embodiment of the present disclosure will be described. Read head 10 may be used in the read/write head 9A illustrated in FIG. 2 and discussed above.

The read head 10 may include a pair of side-by-side MIMO read sensors 11, which may be separated by a distance D2. Distance D2 may be in a range from 10-200 nm, and more preferably may be in a range from 10-50 nm. Typically, the MIMO read sensors are substantially parallel and separated by a distance. The pair of MIMO read sensors may be disposed between a bottom shield and a top shield and between a pair of side shields that are exchange coupled to the top shield, to thereby form a wraparound shield configuration.

The read head 10 may further include a pair of electrical leads 18, each of which is coupled with one of the MIMO read sensors 11, wherein the electrical leads 18 extend away from an air bearing surface line A-A of the read head 10, and each is configured with a respective flared portion 38. The flared portions 38 have a lateral separation between them that increases with an increasing distance from an air bearing surface line A-A of the read head that is formed transversely to the length of the leads. The flared portion 38 of one of the electrical leads 18 may extend symmetrically in an opposite direction away from the flared portion 38 of the other electrical lead 18. The electrical leads 18 may be oriented at respective angles B, C from an axis of the parallel portion, which angles are typically the same, but may vary in some embodiments. Further, these angles B, C typically range between 0 and 70 degrees, and more preferably between 30 and 60 degrees. These ranges have the advantage of providing sufficient distance from the parallel portion 42 per unit length of flared portion 38 to accommodate lead stitching, as discussed below. Further, the flared portion 38 of each electrical lead 18 may be formed to be substantially linear. The electrical leads 18 may comprise various nonmagnetic materials, such as tungsten, rhodium, chromium and tantalum, or magnetic materials such as nickel, iron, or cobalt or alloys thereof and may be electrically decoupled from the top magnetic shield and the magnetic side shields.

The read head 10 may further include electrodes 19 deposited in a separate step so as to be respectively contacted to an end of each of the flared portions (which hereafter we refer to as stitched electrodes), which will be used to connect the read heads to the electronics on the slider. It will be noted that the top magnetic shield may be shaped to not extend over a back edge to which the electrical leads 18 extend, shown at the top in FIG. 3. Alternatively, the top magnetic shield may extend over a back edge to which the electrical leads 18 extend, and vias may be made through the top magnetic layer and the insulating material to contact the lead structures (LS) 18 and form the lead stitches 19.

The side-by-side MIMO read sensors 11 may be formed to have the same width and be separated by a distance D2 that is substantially constant and is defined by the width of the resist line used for sidewall line doubling. In this manner, the leads are self-aligned, or forced into a side-by-side configuration through the deposition of a hard mask material on the sidewalls of the resist pattern. The side-by-side configuration of the sensors 11 provides electrical, magnetic, and thermal separation between the sensors 11.

Figure 12:
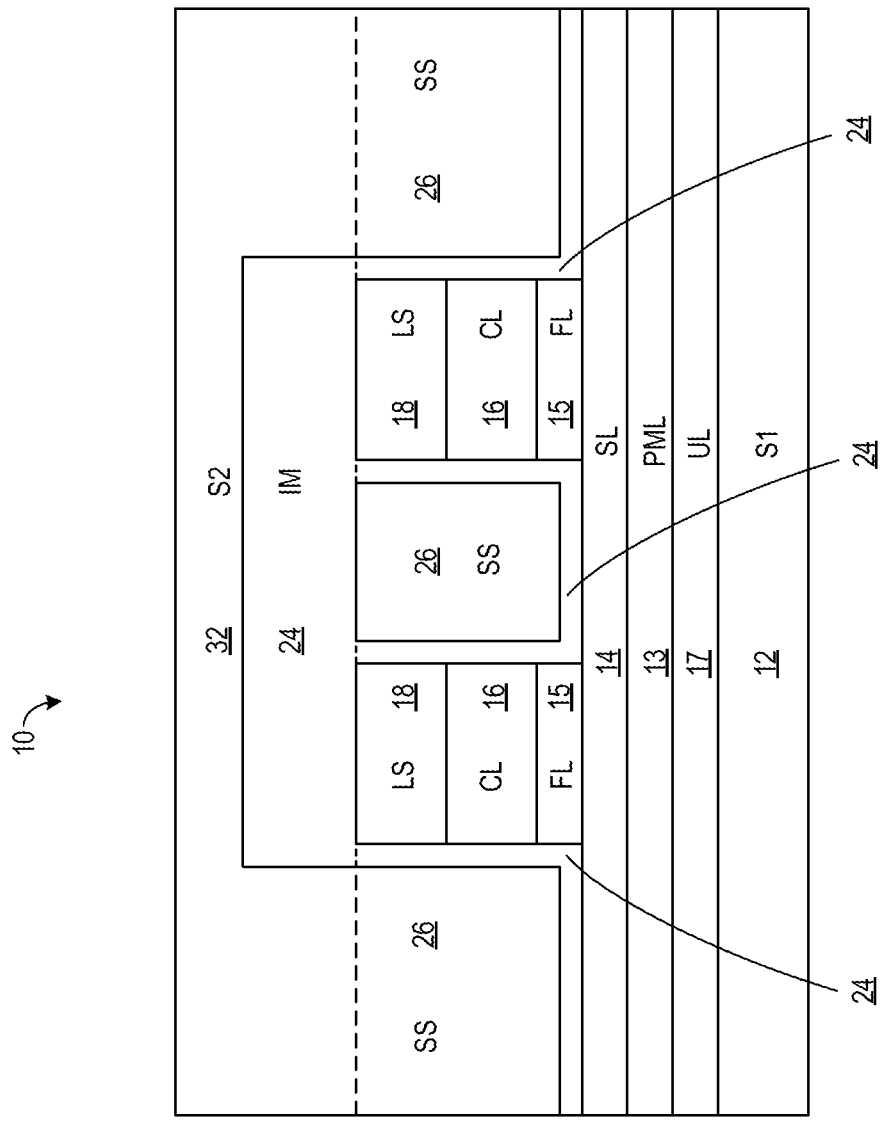
FIG. 12 is a schematic, cross-sectional illustration taken along line A-A in FIG. 13 of a read head being manufactured, continuing from the previous Figure, after insulating material and the top magnetic shield have been added.

The side-by-side sensors 11 may be shielded on all sides by a top magnetic shield, a bottom magnetic shield, and magnetic side shields that are exchange coupled with the top magnetic shield and form a wrap-around configuration, as shown in FIG. 12, discussed below. The magnetic shields are formed of electrically conductive ferromagnetic material and function to shield the read head from recorded data bits that are neighboring the data bit being read. The bottom shield acts as a shared bottom lead for the two side-by-side sensors while the top shield is electrically decoupled from the top electrical leads through an insulating material to avoid shorting between the sensors. Unlike the shielding configurations that only provide top and bottom magnetic shields, the wrap-around shield provides added stability and magnetic resolution to the sensors and lead structures (LS) 18 by configuring side shields as well.

Continuing with FIG. 3, the pair of side-by-side MIMO read sensors 11 are disposed in a parallel portion 42 between the bottom shield and the top shield and between the side shields. In the illustrated embodiment, sensor structures are only found within the parallel portion 42 of the read head, while the lead structures (LS) 18 are found in both the parallel portion 42 and the flared portions 38, although other configurations are possible.

The electrical leads 18 extend away from an air bearing surface line A-A and are configured with flared portions 38 having a lateral separation that increases with an increasing distance from an air bearing surface that is formed transversely to the length of the leads. The electrical leads 18 are surrounded by insulating material that electrically and magnetically isolates them from the surrounding electrical and magnetic structures, and are therefore electrically decoupled from the top magnetic shield and the magnetic side shields. Electrodes are stitched on the flared portions 38 of the electrical leads, as shown in the shaded black areas, to connect the sensors and the lead structures (LS) 18 with the rest of the slider electronics.

Figure 4:
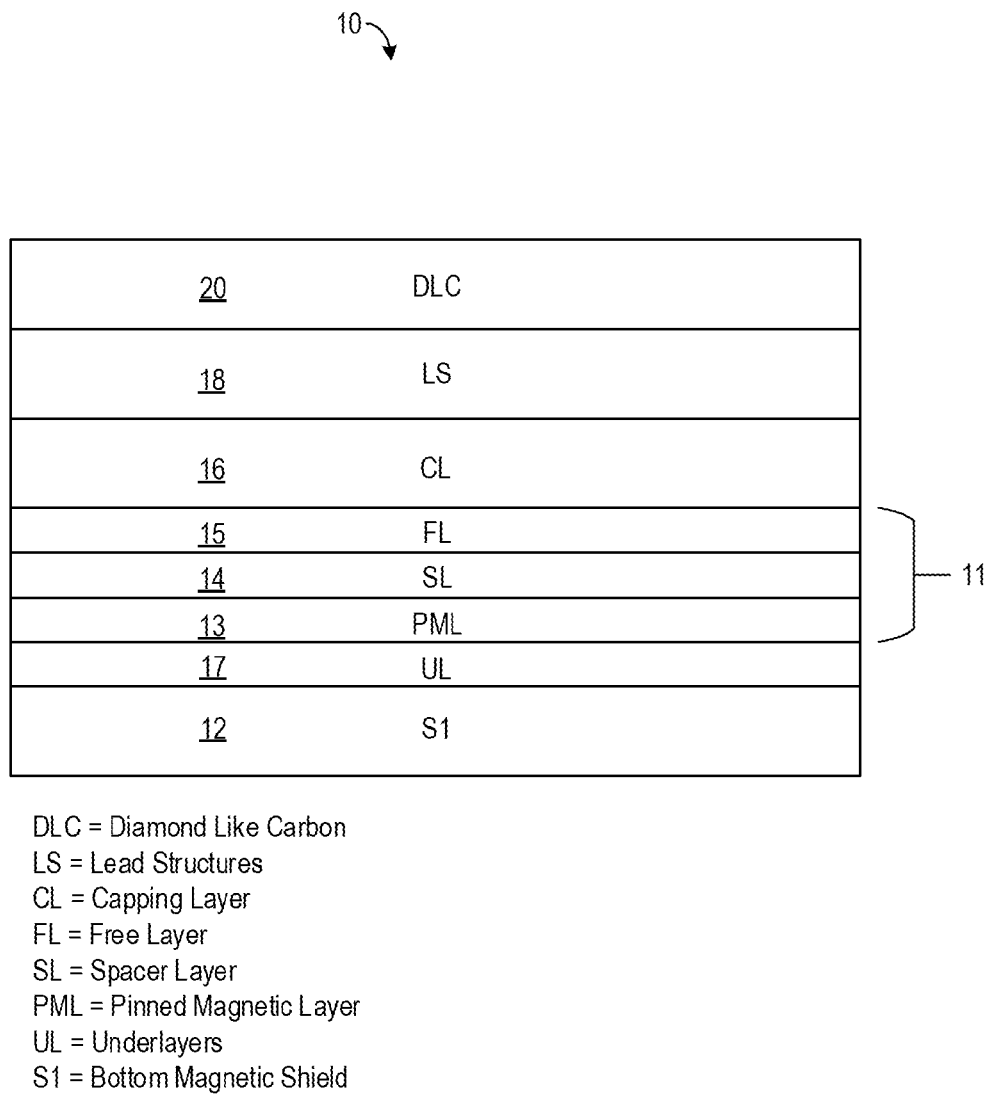
FIG. 4 is a schematic, cross-sectional illustration of a read head being manufactured on a wafer, showing a deposited sensor layer, capping layer, electrical leads, and a first hard mask layer.

FIGS. 4 through 13 illustrate a read head 10 at various stages of manufacture according to one embodiment of a manufacturing process for making the read head 10. As shown in FIG. 4, a sensor 11 is formed over a bottom magnetic shield (S1) 12 and underlayers (UL) 17, comprising at least three layers: a pinned magnetic layer (PML) 13, a nonmagnetic spacer layer (SL) 14, and a free layer (FL) 15. While the pinned magnetic layer (PML) 13 and free layer (FL) 15 have been shown and described as single layers, it is contemplated that the pinned magnetic layer (PML) 13 may comprise a multilayer structure such as an antiferromagnetic layer, pinned magnetic layer (PML) 13, nonmagnetic spacer layer (SL) 14, and reference magnetic layer, which collectively form a pinned structure. By applying photoresist masks, the sensor layer is not deposited on the portion of the wafer where the flared portions of the electrical leads are to be fabricated. It will be appreciated that the sensor layer may also not be deposited on a small area, adjacent to the flared portions, where the parallel portion of the electrical leads is to be fabricated.

The nonmagnetic spacer layer (SL) 14 can be comprised of an insulating material such as magnesium oxide (MgO), hafnium dioxide ($HfO_2$), titanium dioxide ($TiO_2$), or aluminum oxide ($Al_2O_3$) or a conductive layer such as copper (Cu) or silver (Ag). A capping layer (CL) 16 may be deposited on the sensor. The capping layer (CL) 16 may comprise ruthenium or ferromagnetic materials such as nickel or nickel alloys and have a thickness of between about 2 nm and about 10 nm. Nonmagnetic capping layers may confer the potential advantage of avoiding damage to the sensor during processing. Magnetic capping layers may confer the additional advantage of reducing magnetic spacing between the top and bottom magnetic shields, which may help with magnetic resolution. The lead structures (LS) 18 may then be deposited. The lead structures (LS) 18 may consist of a highly conductive metal, such as tungsten or tantalum, and may be deposited by sputtering to a thickness of between about 5 nm and about 10 nm. This thickness is chosen to minimize the gap between the top shield and the sensor while keeping the resistivity of the lead structures (LS) 18 low. A first hard mask layer 20 is then deposited, which may consist of DLC or other suitable material, and shown in the Figures as DLC.

Figure 5:
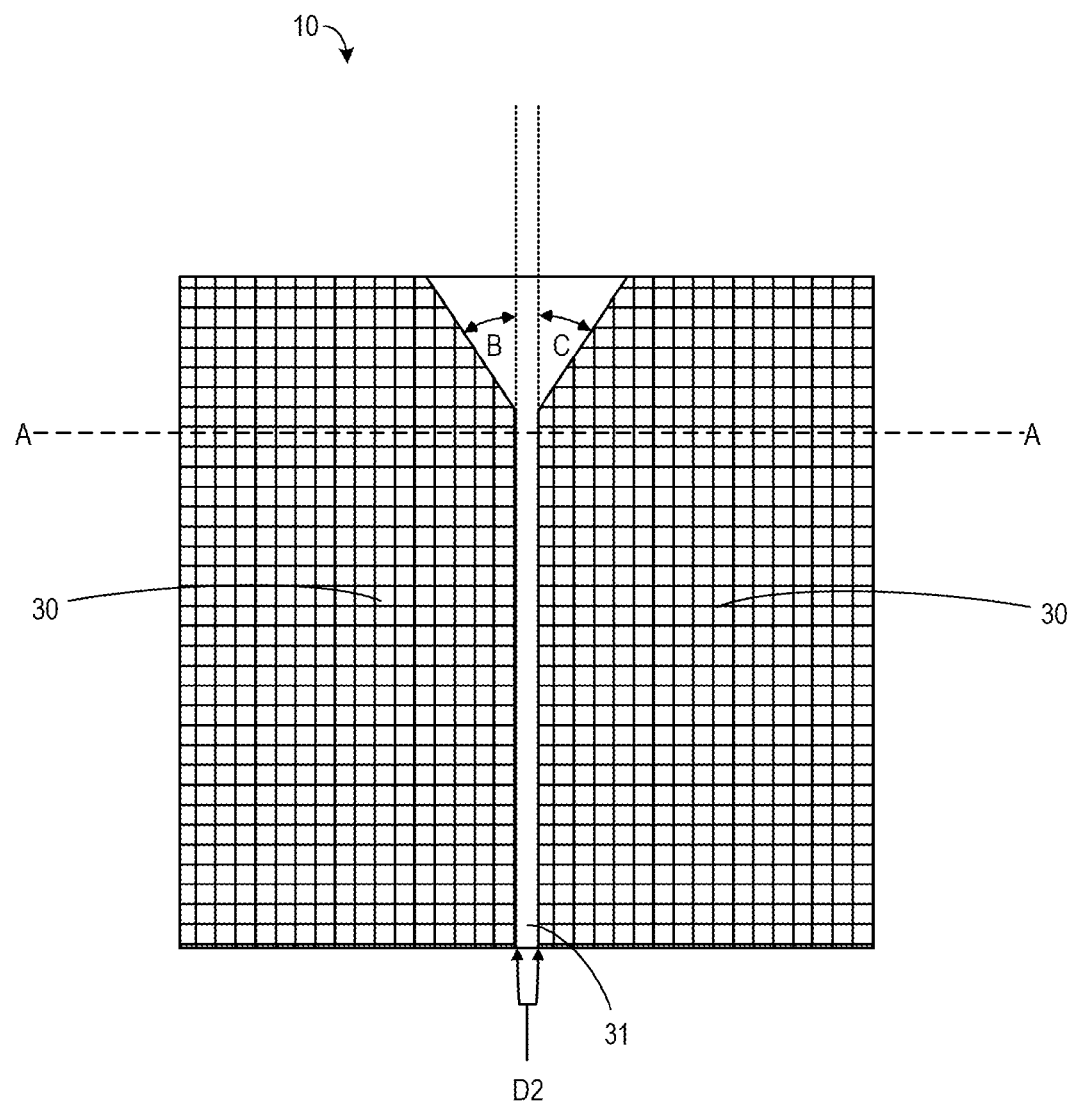
FIG. 5 is a plan view illustration of the read head being manufactured, continuing from the previous Figure, after a lithography step to apply a photoresist mask to form a narrow resist line.
Figure 6:
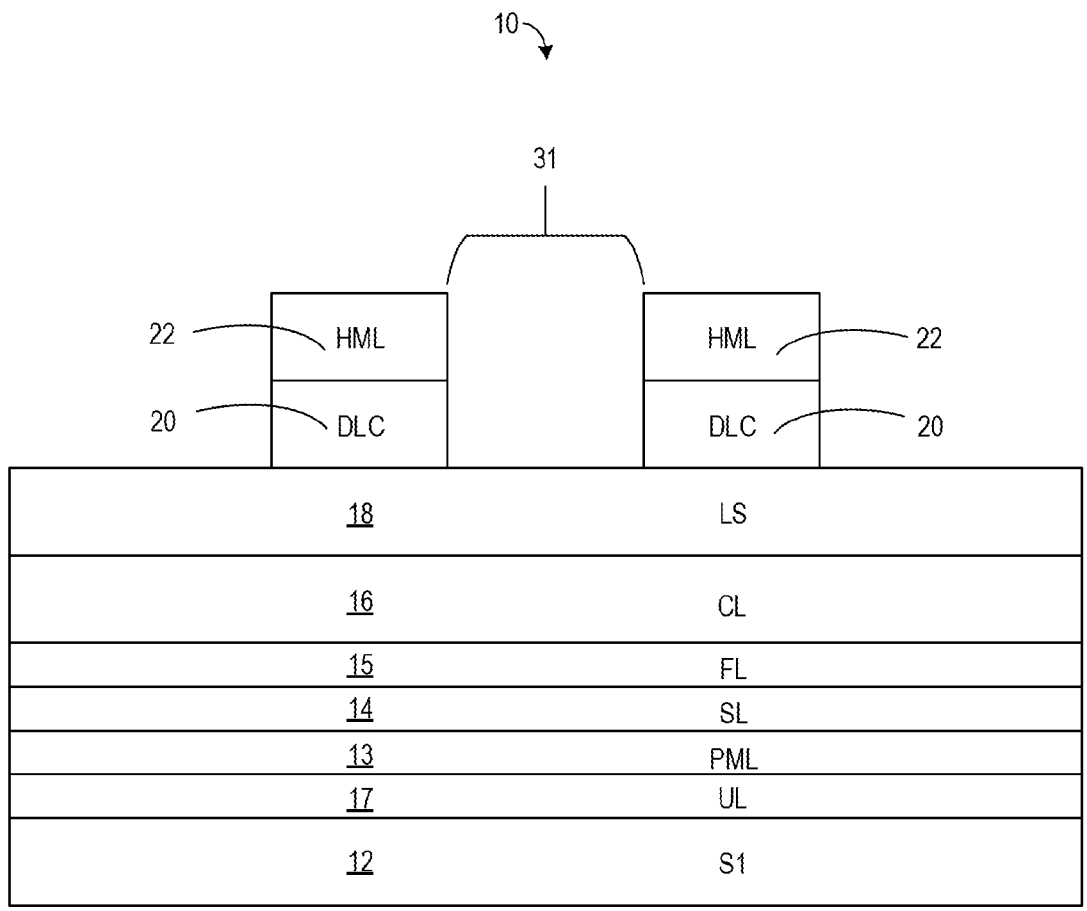
FIG. 6 is a schematic, cross-sectional illustration of the read head being manufactured, continuing from the previous Figure, after the first and second hard mask layers are patterned into two side-by-side stripes through the sidewall spacer line doubling process.

Now referring to FIG. 5, a lithography step produces a photoresist mask 30, which is used to pattern the second hard mask layer (HML) 22 and first hard mask layer (DLC) 20 into two side-by-side stripes through the sidewall spacer line doubling process in the parallel portion and the sidewall lithography process in the flared portions. The second hard mask layer (HML) 22 may include chromium, silicon dioxide, aluminum oxide, tantalum oxide, titanium oxide, or similar materials. After forming a sensor above a bottom shield, wherein the sensor comprises a nonmagnetic spacer layer (SL) 14 between two magnetic layers, a photoresist mask pattern is formed with two open windows (indicated by the cross-hatched regions in FIG. 5) separated by an unmasked space that forms a narrow resist line 31 (hereafter referred to as a mandrel) with a width equivalent to distance D2, or the same distance that separates the pair of side-by-side MIMO read sensors. The sidewall spacer line doubling process deposits the second hard mask layer over the sensor and mandrel 31, and then reactive ion etches the second hard mask layer (HML) 22, uncovering the mandrel 31. The mandrel 31 is then etched away to expose the sensor. The remaining second hard mask layer (HML) 22 is then used to etch and pattern the first hard mask layer 20, as shown in FIG. 6.

Figure 7:
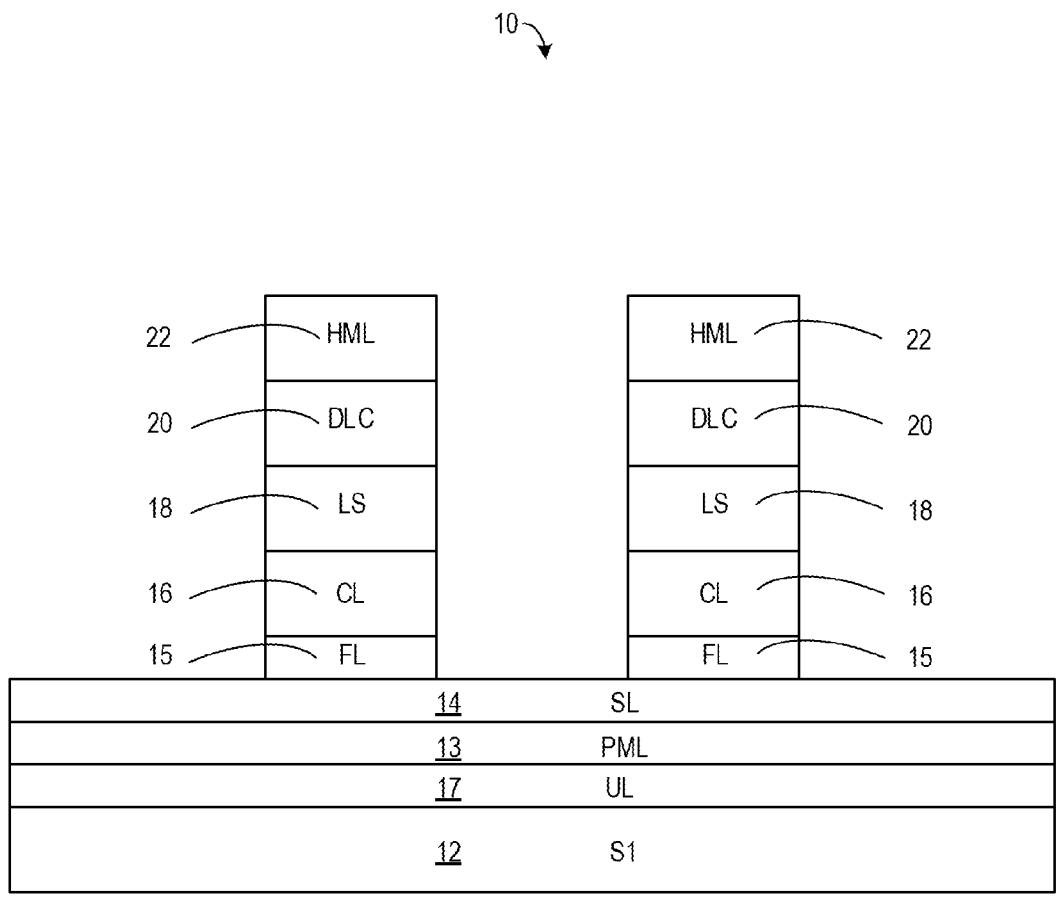
FIG. 7 is a schematic, cross-sectional illustration of the read head being manufactured, continuing from the previous Figure, after side-by-side sensors have been etched.

The first hard mask layer 20 is then used to etch the sensor to form side-by-side sensors, as shown on FIG. 7. Only the first layer of the two magnetic layers that comprise the sensor is etched (although the etch depth can be made deeper if desired), such that the side-by-side sensors are present. The first layer of the two magnetic layers includes a first portion spaced from a second portion by a distance that may be equal to a width of the mandrel, and the first portion and second portion have substantially identical dimensions, equal to those of the thickness of the second hard mask layer following its deposition over the mandrel 31.

Figure 8:
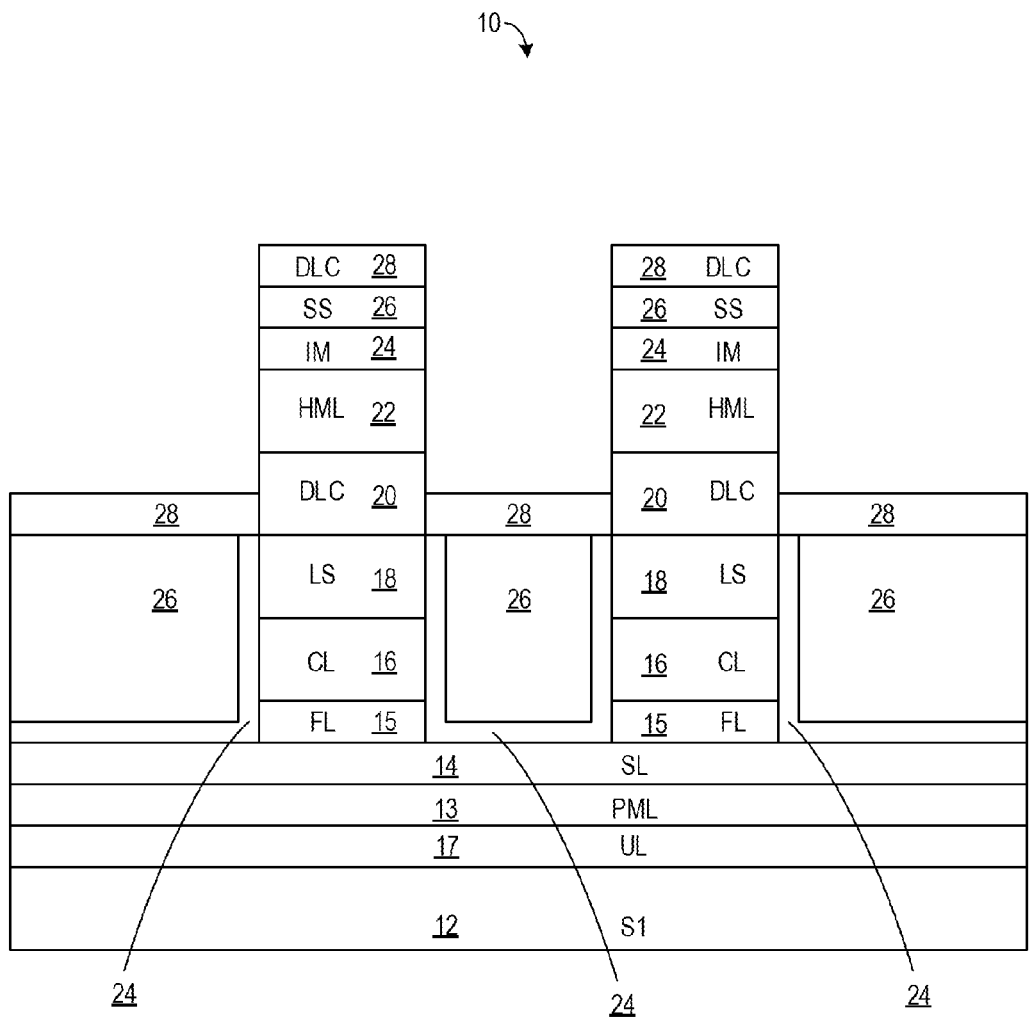
FIG. 8 is a schematic, cross-sectional illustration of the read head of FIG. 3 being manufactured, continuing from the previous Figure, after thin insulation, magnetic side shield, and a third hard mask layer have been deposited.
Figure 9:
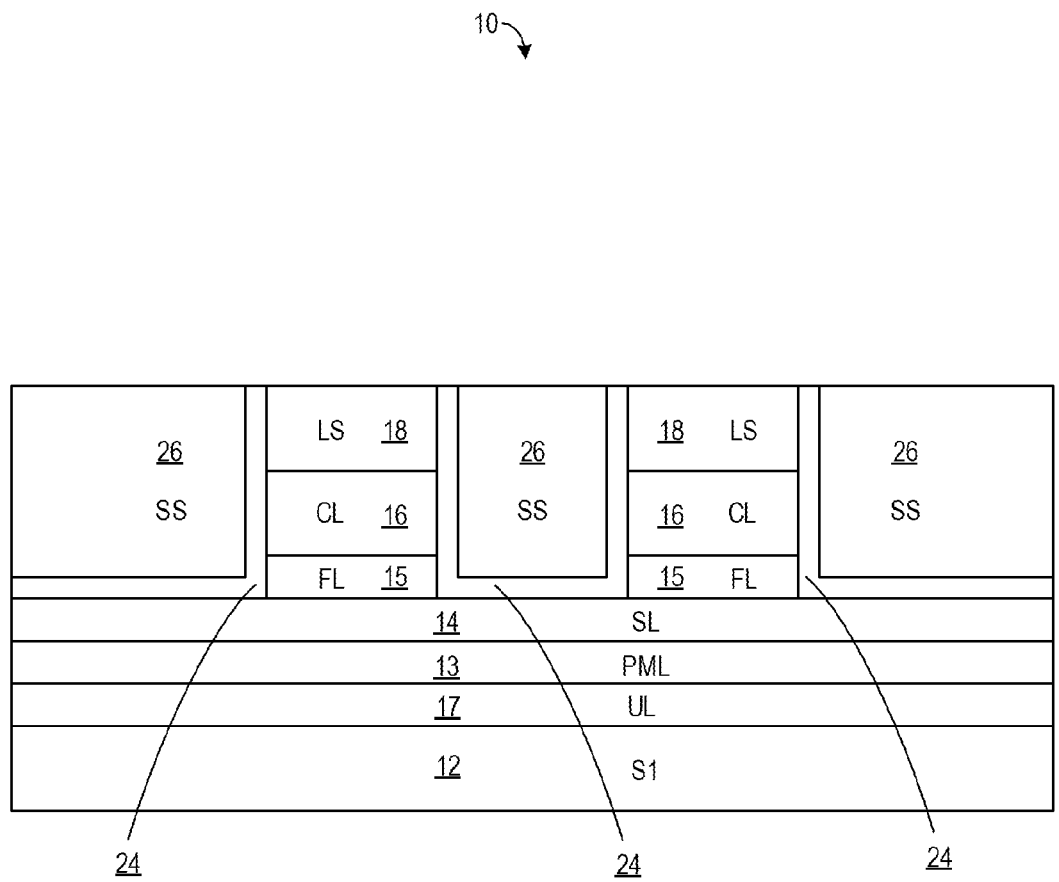
FIG. 9 is a schematic, cross-sectional illustration of the read head being manufactured, continuing from the previous Figure, after polishing down to the first hard mask layer and removing the first hard mask layer.

As illustrated in FIG. 8, after the side-by-side sensors are formed, insulating material (IM) 24, magnetic side shield (SS) 26, and an additional third hard mask layer 28 are deposited. The third hard mask layer may consist of diamond like carbon or other suitable material, and is shown in the Figures as DLC. A polishing process then occurs, such as a CMP process, to polish down to the third hard mask layer 28, then reactive ion etching removes the third hard mask layer 28 to expose the lead structure layer as shown in FIG. 9. Columns of layers, including the sensor, the capping layer (CL) 16, and the lead structures (LS) 18, are surrounded by layers of thin insulation 24 to electrically decouple the sensors of the side-by-side sensors from the magnetic shields and by layers of magnetic side shields (SS) 26 that will exchange couple with the top magnetic shield.

Figure 10:
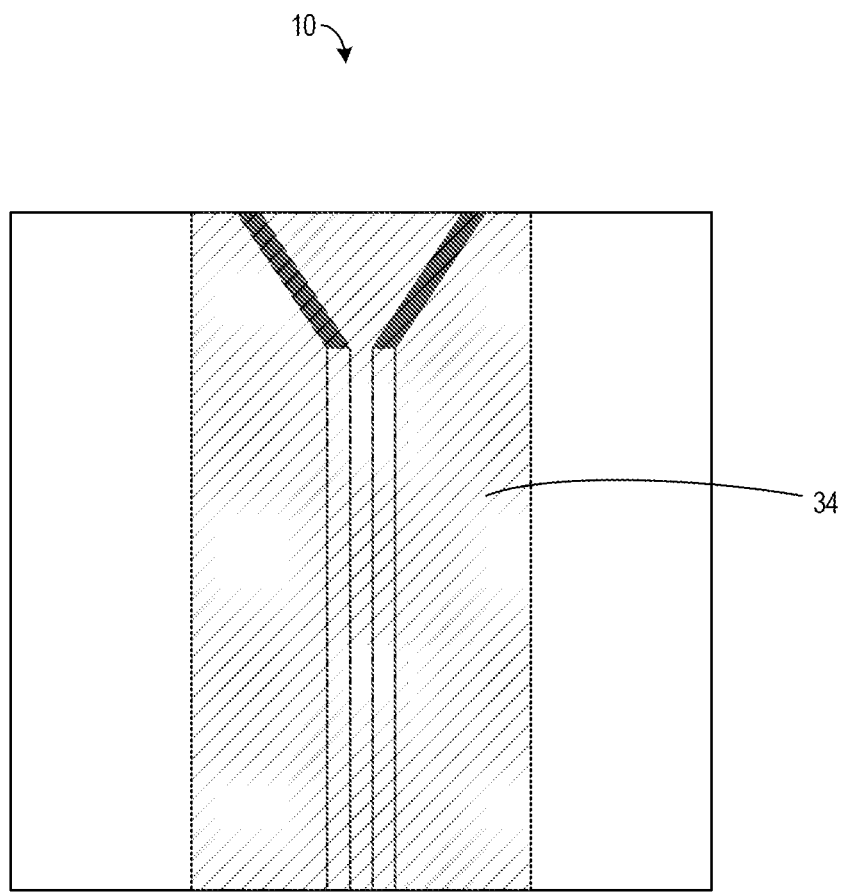
FIG. 10 is a plan view illustration of the read head being manufactured, continuing from the previous Figure, after lead and sensor material have been thinned or removed beyond the original area in which the sensor layer was deposited.

Now referring to FIG. 10, which is a plan view of a read head being manufactured after the lead structures (LS) 18 have been formed, an additional phase is added to thin or remove the lead material beyond the original area in which the sensor layer was deposited. A photoresist mask 34, which protects the lead structures (LS) 18 which remain in the finished head above the air bearing surface, is added on top of the sensor. Reactive ion etching and/or ion milling removes the lead structure, capping layer (CL) 16, and the sensor layer outside the photoresist mask, exposing the bottom magnetic shield (S1) 12. This etch step is followed by an insulator deposition and lift-off of the photoresist mask. In FIG. 10, the flared portions of the lead structures (LS) 18 are shaded black to define the location of the stitched leads, which will be formed in the last step.

Figure 11:
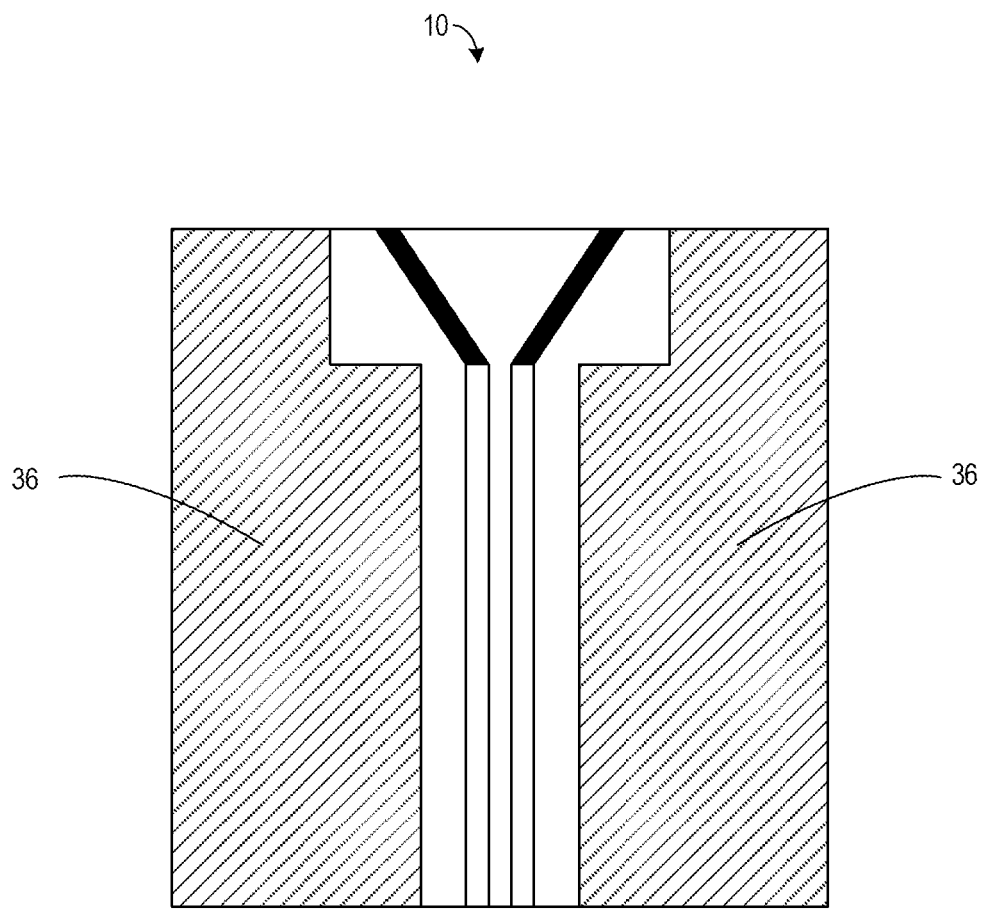
FIG. 11 is a plan view illustration of the read head being manufactured, continuing from the previous Figure, after depositing insulating material over the sensor and lead structures.

Now referring to FIGS. 11 and 12, a photoresist mask layer 36 is then added on top of the area outside the extant sensor and lead structures (LS) 18. Insulating material (IM) 24 is deposited over the exposed area of the wafer that lacks a photoresist mask layer 36, covering the sensor and lead structures (LS) 18. The deposition of insulating material (IM) 24 is followed by the lift-off of the photoresist mask layer 36 and the deposition of the top magnetic shield (S2) 32, which is a magnetically permeable material. Thus, the top magnetic shield (S2) 32, and the magnetic side shields (SS) 26 form one contiguous wrap-around layer consisting of the same magnetically permeable material, surrounded by insulating material (IM) 24 that electrically and magnetically isolates it from the bottom magnetic shield (S1) 12. A polishing process such as a CMP process can then be performed as necessary to planarize the top magnetic shield (S2) 32.

FIG. 12 illustrates the read head after the insulating material (IM) 24 and the top magnetic shield (S2) 32 have been deposited and polished. The read head incorporates magnetic shields on all sides: a top magnetic shield (S2) 32, a bottom magnetic shield (S1) 12, and magnetic side shields (SS) 26 that are exchange coupled to the top magnetic shield (S2) 32. The pair of side-by-side MIMO read sensors are disposed between the bottom magnetic shield (S1) 12 and the top magnetic shield (S2) 32 and between the magnetic side shields (SS) 26. The shields function to shield the read head from recorded data bits that are neighboring the data bit being read. They are formed of magnetically permeable material and are electrically conductive, but although the two sensors share a common bottom lead through S1, S2 is electrically decoupled from the electrical leads through an insulating material (IM) 24. The bottom magnetic shield (S1) 12 serves as a substrate to simultaneously pattern the sensors and the lead structure. The magnetic side shields (SS) 26 comprise a wrap-around shield configuration that is exchange coupled with the top magnetic shield (S2) 32, providing added stability to the shielding.

Figure 13:
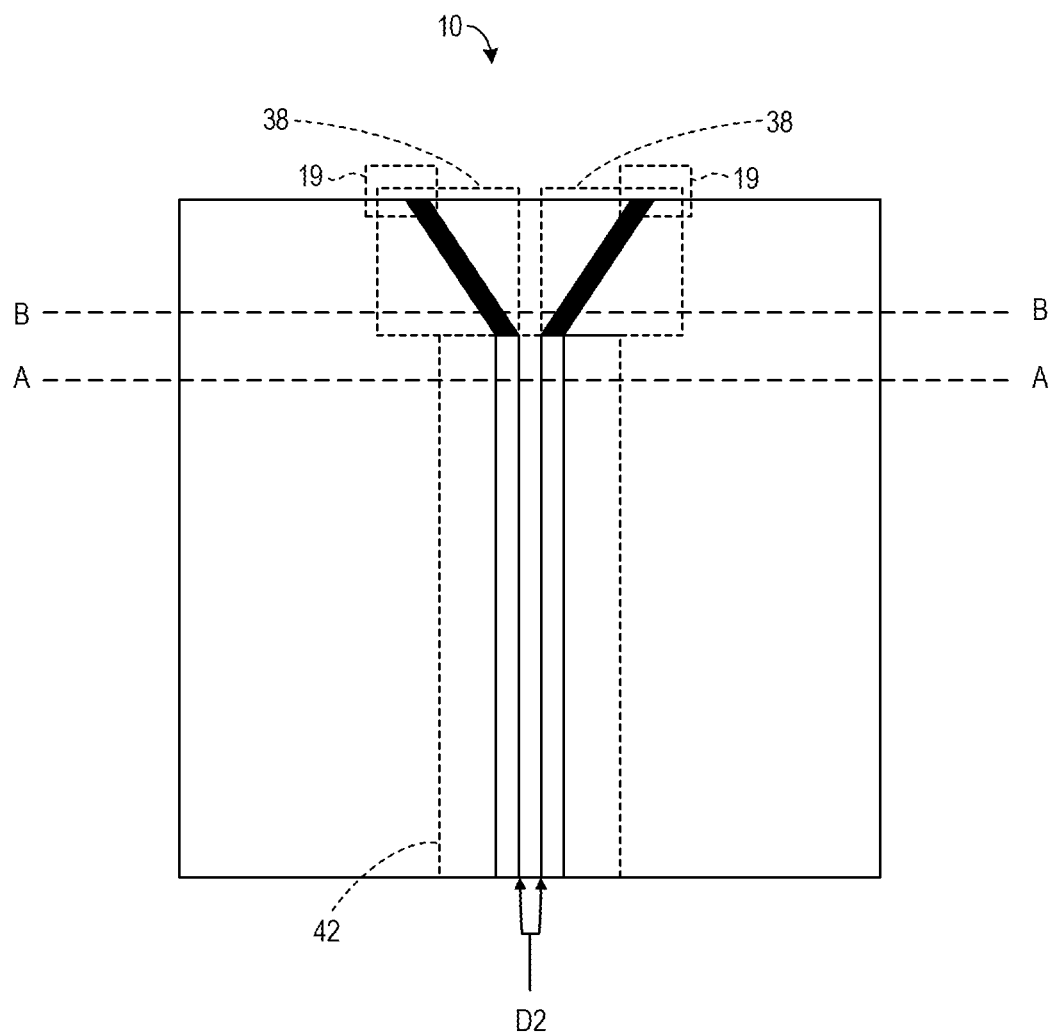
FIG. 13 is a schematic illustration of the read head being manufactured, continuing from the previous Figure, showing the flared portions being prepared for the formation of lead stitches.

Now referring to FIG. 13, a photoresist mask is deposited over each one of the pair of lead structures (LS) 18 in the flared portions 38, where the stitched electrodes 19 are formed. In one possible configuration, vias are made through the top magnetic layer and the insulating material (IM) 24 to contact the lead structures (LS) 18 and form the lead stitches. In another possible configuration, where the top magnetic shield layer does not extend to the flared portions, the lead stitches can be formed directly on top of the lead structures (LS) 18 before the insulating material (IM) 24 and top magnetic shield are added. In such a configuration, the top magnetic shield is shaped to not extend over a back edge where the electrical leads extend.

As illustrated in FIG. 13, the read head manufactured by the above described process is divided into the parallel portion 42 and the flared portions 38. In the parallel portion 42, the electrical leads are disposed side-by-side in a parallel formation. In the flared portions 38 of the read head, which are more distal from the air bearing surface and adjacent to the parallel portion, the side-by-side sensors are coupled to electrical leads with a lateral separation that increases with an increasing distance from an air bearing surface, which is formed perpendicularly to the length of the electrical leads and will later be formed at line A-A, which may be formed only 20-60 nm from the junction between the parallel portion 42 and the flared portions 38. The lateral separation can reach up to 100-600 nm in the flared portion 38, compared to the 20-50 nm width between electrical leads in the parallel portion of the read head. Thus, the increased width between the lead structures (LS) 18 in the flared portion 38 allows sufficient room to stitch electrodes, lowering the risk of creating a short circuit and consequently simplifying the manufacturing process, thereby lowering costs. The length of the flared portion is preferred to be within a range of 100-400 nm, which provides adequate conductivity without excessive resistance. It will be appreciated that excessive length can lead to higher electrical resistances, which are undesirable. The electrical leads may consist of nonmagnetic materials such as tungsten or tantalum or magnetic materials such as nickel (Ni) or nickel-iron alloy (NiFe) and are kept electrically decoupled from the top magnetic shield and the magnetic side shields (SS) 26. The lead stitches may consist of conductive material that is surrounded by insulating material (IM) 24.

Figure 14:
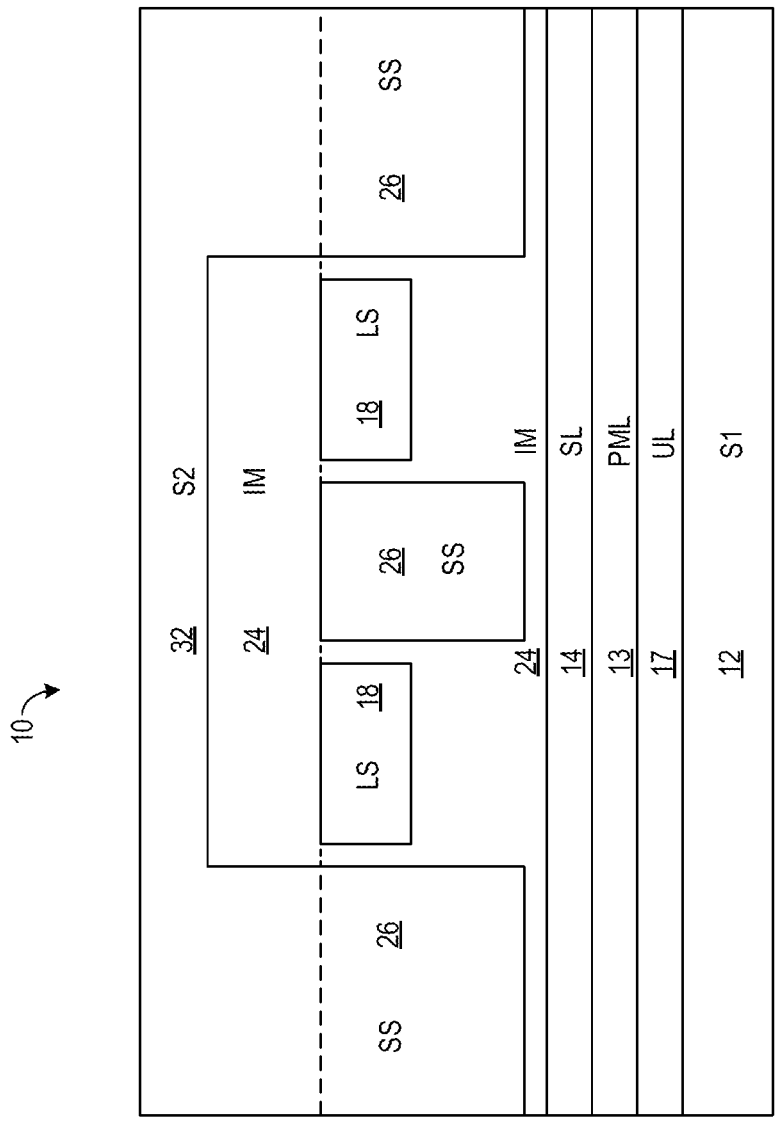
FIG. 14 is a schematic, cross-sectional illustration taken along line B-B in FIG. 13 of a read head being manufactured, continuing from the previous Figure, after insulating material and the top magnetic shield have been added.

The sensor in FIG. 13 is lapped so that the lower portion of the line A-A is removed. Thus, the line A-A corresponds to the air bearing surface, which may be formed only 20-60 nm from the junction between the parallel portion 42 and the flared portions 38. FIG. 12 shows the cross-sectional view of the sensor taken along the line A-A in FIG. 13. FIG. 14 shows the cross-sectional view of the sensor taken along the line B-B in FIG. 13. Sensor structures are not present within the flared portions 38. Thus, in FIG. 14, only two electrical leads (LS) 18 can be found, isolated from the nonmagnetic spacer layer (SL) 14, pinned magnetic layer (PML) 13, underlayers (UL) 17, and the magnetic shields by insulating material (IM) 24.

The term DLC is used throughout the patent application. DLC refers to diamond like carbon. It is to be understood that DLC is used therein as an example material for a hard mask or a stopping layer (such as a CMP or RIE stop layer). DLC is used for example purposes only. It is to be understood that the hard mask layer may comprise materials other than DLC.

It will be understood that the configurations and/or approaches described herein are exemplary in nature, and that these specific embodiments or examples are not to be considered in a limiting sense, because numerous variations are possible. The specific methods described herein include processes illustrated and/or described that may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A side-by-side magnetic multi-input multi-output (MIMO) read head comprising:
   a pair of side-by-side MIMO read sensors; and
   a pair of electrical leads, each of which is coupled with one of the MIMO read sensors, wherein the electrical leads extend away from an air bearing surface of the read head,
   wherein each electrical lead is configured with a respective flared portion, the flared portions having a lateral separation between them that increases with an increasing distance from an air bearing surface of the read head that is formed transversely to the length of the leads, so that the lateral separation between the flared portions reaches up to 5 to 30 times a lateral separation of a parallel portion of the electrical leads.

2. The MIMO read head of claim 1, further comprising:
   an electrode stitched adjacent to an end of each of the flared portions.

3. The MIMO read head of claim 1,
   wherein the MIMO read sensors are substantially parallel and separated by a distance;
   wherein the flared portion of one of the electrical leads extends in an opposite direction away from the flared portion of the other electrical lead; and
   wherein the flared portion of each electrical lead is formed to be substantially linear.

4. The MIMO read head of claim 1,
   wherein the electrical leads comprise nonmagnetic material selected from the group consisting of tungsten, rhodium, chromium, and tantalum or magnetic material selected from the group consisting of nickel, iron, cobalt, nickel alloy, iron alloy, and cobalt alloy;
   wherein the electrical leads are electrically decoupled from a top magnetic shield and a pair of magnetic side shields;
   wherein the pair of MIMO read sensors is disposed between a bottom shield and the top shield and between the pair of magnetic side shields that are exchange coupled to the top shield; and
   wherein the top magnetic shield is shaped to not extend over a back edge to which the electrical leads extend.

5. A hard disk drive comprising the MIMO read head of claim 1.

6. A method of making a side-by-side magnetic multi-input multi-output (MIMO) read head, comprising:
   forming a pair of side-by-side MIMO read sensors disposed between a bottom shield and a top shield and a pair of side shields; and
   forming a pair of electrical leads, each of which is coupled with one of the MIMO read sensors, wherein the electrical leads are formed so as to extend away from an air bearing surface, wherein each electrical lead is formed with a respective flared portion, the flared portions having a lateral separation between them that increases with an increasing distance from an air bearing surface of the read head that is formed transversely to the length of the leads, so that the lateral separation between the flared portions reaches up to 5 to 30 times a lateral separation of a parallel portion of the electrical leads.

7. The method of claim 6, wherein each electrical lead is configured with a respective flared portion, the flared portions having a lateral separation between them that increases with an increasing distance from an air bearing surface of the read head that is formed transversely to the length of the leads.

8. The method of claim 7, further comprising:
   forming a stitched electrode on each of the flared portions of the electrical leads.

* * * * *